United States Patent [19]
Couch

[11] 3,783,198

[45] Jan. 1, 1974

[54] BATTERY REVERSAL DETECTION

[75] Inventor: Francis O. Couch, Belmont, Calif.

[73] Assignee: GTE Automatic Electric Laboratories Incorporated, Northlake, Ill.

[22] Filed: Mar. 18, 1971

[21] Appl. No.: 125,674

[52] U.S. Cl. .......................... 179/16 AA, 179/18 FA
[51] Int. Cl. .............................................. H04m 3/22
[58] Field of Search ...................... 179/16 A, 16 AA, 179/18 F, 18 FA, 18 H, 18 HB, 84 R, 84 A, 7 R, 7.1 R, 9 R, 16 E, 16 EA; 307/236, 311

[56] References Cited

UNITED STATES PATENTS

| | | | |
|---|---|---|---|
| 3,504,127 | 3/1970 | Slana | 179/16 F |
| 3,410,961 | 11/1968 | Slana | 179/18 FA |
| 3,321,583 | 5/1967 | Maul | 179/18 FA |
| 2,913,532 | 11/1959 | Pharis | 179/18 H |
| 2,824,171 | 2/1958 | Gatzert | 179/18 H |

FOREIGN PATENTS OR APPLICATIONS

| | | | |
|---|---|---|---|
| 884,832 | 12/1961 | Great Britain | 179/18 F |
| 1,513,305 | 1/1968 | France | 179/18 FA |

*Primary Examiner*—Kathleen H. Claffy
*Assistant Examiner*—Randall P. Myers
*Attorney*—Russel A. Cannon, Theodore C. Jay, Jr. and Leonard R. Cool

[57] ABSTRACT

Electronic circuitry for detecting battery reversal in telephone control signaling while completely isolating signaling circuits with logic circuits and at the same time interfacing signaling circuits with logic circuits.

4 Claims, 3 Drawing Figures

INVENTOR.
FRANCIS O. COUCH

BATTERY REVERSAL DETECTION

BACKGROUND OF INVENTION

In the operation of telephone systems there are employed various types of signaling related, for example, to initiating a request for service, maintaining or releasing connections and establishing desired connections. One common signaling condition is normally termed battery reversal. In this respect it is conventional to identify tip and ring contacts in telephone circuits with the tip contact normally grounded and the ring contact normally connected to a negative potential termed negative battery. Without attempting to discuss the general field of telephone signaling, it is only briefly noted that lifting of a telephone receiver when the set rings produces a reversal of battery within the central office, i.e., electrically grounds the ring contact and connects the tip contact to the negative battery. This situation is then signaled to the originating station or operator as an identification of circuit completion. Replacing the receiver of a telephone set on the hook returns the tip and ring potentials to original condition, i.e., grounding of the tip contact and connection of the ring contact to the negative potential or negative battery. This also is to be signaled. Reverse battery signaling is well known. Techniques for providing a reverse battery indication on the tip and ring leads at the originating station are described in the text "Telephone Theory and Practice — Automatic Switching and Auxiliary Equipment" by K. B. Miller, pp. 114 – 116, McGraw Hill Book Company, Inc., 1933, first edition, fifth impression. A simplified circuit diagram which schematically shows the essential elements for reverse battery signaling at both the calling office (originating station) and the called office (terminating station) and a brief description of the operation thereof is given in the publication "Notes on Distant Dialing", published by the American Telephone & Telegraph Company, 1968, section 4, Signaling, pp. 13.

Prior art battery reversal detection was commonly accomplished through the medium of electromechanical relays. Some discussion of prior art systems of this general type is included below and thus it is only briefly noted here that electromechanical relays are disadvantageous in this application with regard to the requisite size, weight and power dissipation thereof. Furthermore, relays of this type are particularly susceptible to shock and vibration.

There have been developed wholly electronic battery reversal detection systems as an improvement upon electromechanical relay systems. While problems of size, weight and power dissipation are minimized in an electronic detection system, prior art electronic detection systems have seriously suffered from the loss of isolation therein. It is of particular importance to isolate the battery circuits from common equipment in the system in order to preclude introduction of noise and interference into the voice circuits and also to prevent possible voltage or current pulses from damaging equipment. Despite the use of electrical filters and protective diodes, it has been found that insufficient isolation is provided. The present invention provides a fully electronic battery reversal detection system having complete isolation so that no possible noise or interference may be coupled into the voice circuits nor can transient voltage or current pulses reach common equipment that could be damaged thereby.

SUMMARY OF INVENTION

There is provided by the present invention a wholly electronic battery reversal detection system and interface. The circuit of the present invention incorporates the parallel combination of a a light emitting diode and a second diode connected with opposite polarities between tip and ring leads of a telephone circuit. Normal battery current is conducted by the second diode while reverse battery causes current to flow through the light emitting diode to thus produce radiation. A photoresponsive device is disposed in operating relationship to the light emitting diode so that radiation from the light emitting diode turns on the photoresponsive device. This device is connected in an output circuit as by means of an output transistor switched between nonconducting and saturated conditions by conduction of the photo-responsive device. An output terminal of the circuit thus receives logic signals from the circuitry of the present invention indicating normal battery or reverse battery between the tip and ring leads.

The invention provides complete isolation between the control signaling circuitry and other portions of telephone equipment and at the same time provides an interface to logic circuitry employing output signals from the present invention.

DESCRIPTION OF FIGURES

The present invention is illustrated as to a particular preferred embodiment thereof and in connection with certain prior art in the accompanying drawings wherein.

DESCRIPTION OF PREFERRED EMBODIMENT

Figure 1:
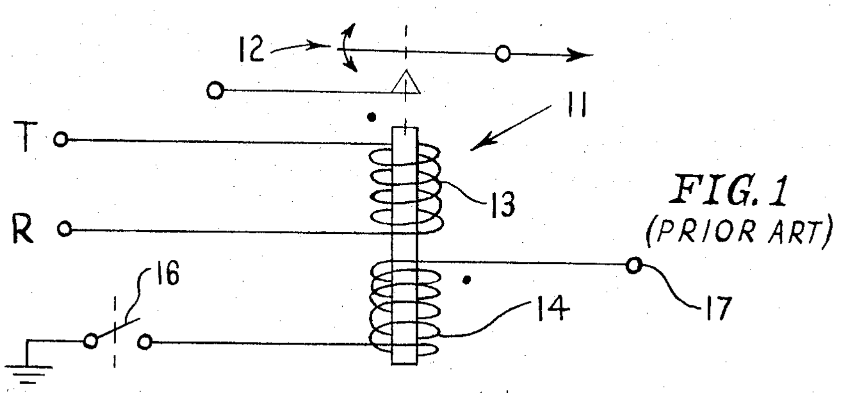
FIG. 1 (PRIOR ART)
FIGS. 1 and 2 are illustrations of conventional prior art circuits for producing battery reversal signals in telephone signaling systems.

In the development of telephone signaling circuitry there has for many years been employed a double winding relay such as illustrated, for example, in FIG. 1 of the drawings. Referring to FIG. 1 there will be seen to be provided a dual coil relay 11 having movable contacts 12 and first and second relay windings 13 and 14. When the telephone circuit is operated or actuated the relay 16 operates to close the circuit between a negative power supply terminal 17 and ground through the relay coil 14. The current through the coil 14 is insufficient to actuate the relay 11. At such time as normal battery voltage appears between the tip and ring leads of the telephone circuit, i.e., terminals T and R of the circuitry of FIG. 1, there is produced a current flow through the winding 13 of the relay 11 that in turn establishes a magnetic field opposing the magnetic field established by current flow through the winding 14 of the relay. At such time as the battery voltage reverses between tip and ring the two magnetic fields of the relay windings 13 and 14 then add together to consequently operate the relay to close the contacts 12 of the relay. In this prior art system, cessation of current flow through either of the relay coils 13 or 14 or reversal of current flow between tip and ring will release the relay.

The system briefly described above and illustrated in FIG. 1 has been employed for many years in telephone signaling systems to indicate battery reversal. It has long been realized that this approach to the problem has certain limitations. In part the system is disadvantageous from the viewpoint of relying upon mechanical movable electrical contacts. Further limitations and disadvantages are to be found in the size, weight and power dissipation of the system as well as the susceptibility of the system to shock and vibration.

Figure 2:
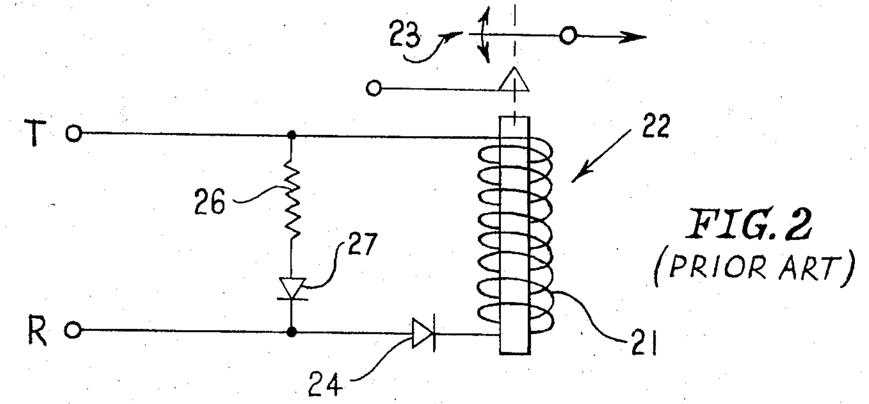
FIG. 2 (PRIOR ART)

In an effort to improve operation of telephone signaling systems to indicate battery reversal therein, there has been developed and widely employed the prior art system of FIG. 2. In this system the tip and ring contacts T and R are connected across a coil 21 of a relay 22 having movable contacts 23 operated by coil energization. A diode 24 is connected in series with the relay coil 21 between the terminals T and R and a series combination of a resistor 26 and diode 27 is connected between the terminals T and R. Normal battery current flows through the resistor 26; however, a reversal of battery current is prevented from flowing through the series connection of resistor 26 and diode 27 by the orientation of the diode so that the reversed battery current then flows through the relay coil 21 to operate the contact 23 of the relay. Limitations and difficulties of this type of circuitry are substantially the same as those of FIG. 1.

There has also been developed a purely electronic circuit for battery reversal detection employing diodes and including a high frequency filter, transient suppression diode and reverse signal blocking diode. This latter system does eliminate the electromechanical relay and attendant problems but at the same time it eliminates one of the main advantages of same, i.e., isolation. Despite the utilization of one or more filters some high frequency energy does enter the voice circuit to create objectionable noise and interference. Additionally it is possible for large negative voltage excursions to be coupled into the system to also produce noise and possibly even damage the circuits.

Figure 3:
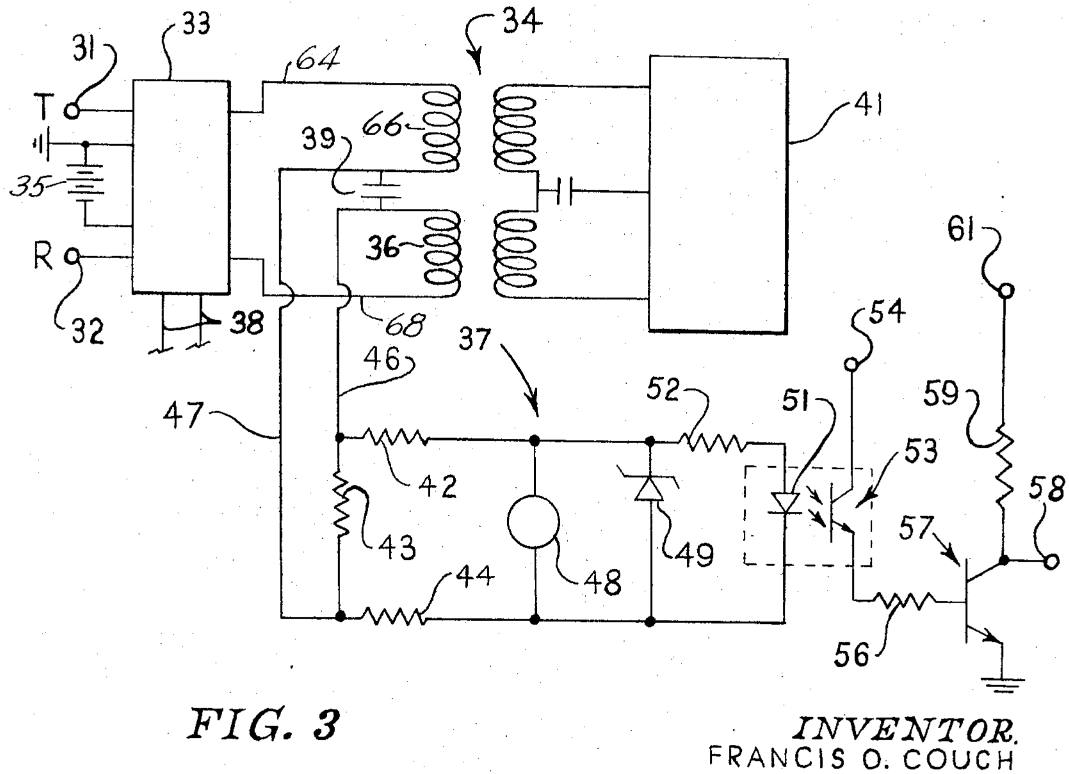
FIG. 3 is a schematic wiring diagram of a preferred embodiment of the present invention.

The present invention provides a circuit for determining direction of current flow between ring and tip terminals in a telephone circuit, i.e., detection of battery reversal, and accomplishes this with a complete isolation from voice channels in a telephone circuit. Referring now to FIG. 3 of the drawings there will be seen to be illustrated a circuit including terminals 31 and 32 labeled T and R respectively in reference to tip and ring in accordance with conventional telephone signaling terminology. The T and R terminals are connected to switching circuitry 33 and via the output of the switching circuitry to the primary windings 36 and 66 of transformer 34. Transformer 34 may be a conventional transformer or it may be a hybrid transformer, the choice of transformer is dependent upon the application and is not pertinent to the operation of Battery Detection Circuitry 37. The T and R terminals may be connected to office equipment as discussed for FIG. 2 hereinabove. In this case, reverse battery is supplied to the T and R terminals; therefore, switching circuitry 33, battery 35, and control leads 38 are not required, and terminals 31 and 32 are connected directly to leads 64 and 68, respectively.

If T and R are connected to office equipment as discussed for FIG. 2, a telephone on-hook at the terminating station, with the other end of the circuit (originating station) on-hook will produce normal battery voltage from a central office battery. Terminal T will be connected through a resistance to ground, i.e., positive with respect to R, and terminal R will be connected through a resistance to the negative power supply terminal. The connections between the T and R terminals and the central office battery will be via cross-connections for reversing these connections (not shown). Thus, normal battery polarity is applied to the terminating station. Lifting of the receiver to off-hook at the terminating station with the receiver at the originating station off-hook reverses this polarity to cause terminal T to be at a negative potential and terminal R to be positive with respect to terminal I, thus reversing the current flow through the primary winding of transformer 34 and, therefore, the Battery Reversal Detection Circuitry 37. This reversal of potential is termed battery reversal. In accordance with requirements in telephone circuits, it is necessary to signal the originating station when battery reversal occurs, i.e., when the telephone unit being called is answered by lifting the receiver from the hook.

Referring again to FIG. 3 of the drawings, it will be seen that the terminals T and R may be connected through switching circuitry 33 across the transformer 34. The local central office battery 35 is connected via switching circuitry 33 to the T and R terminals. Transformer 34 may be either a regular transformer or a hybrid transformer, the choice of transformer is dependent upon the application and is not pertinent to the operation of the Battery Reversal Detection Circuitry 37.

The local central office battery 35 is connected via switching circuitry 33 to conductors 64 and 68. Terminals T and R are connected via office switching equipment in a well-known manner to the subscriber loop circuitry which, of course, includes the terminating telephone set. When the local telephone set is on-hook and the telephone at the originating terminal is off-hook, normal battery polarity, i.e., positive at lead 64 and negative at lead 68, will be present in the battery reversal detection circuitry 37. Lifting of the local telephone (terminating station) to off-hook with the telephone at the originating station off-hook applies a control signal to control leads 38 in the well-known manner. This causes operation of the cross-connection circuitry in 33 and reverses the battery potential applied to leads 64 and 68. It is also noted that there is provided a capacitor 39 connected between adjacent ends of the upper and lower primary windings of the hybrid transformer. The secondary of the hybrid transformer is connected to further circuitry 41 which may be conventional. As is well known, block 41 may represent, in its most elementary form for example, the voice-frequency trunk circuit, originating office switching equipment, the subscriber loop circuitry, and the originating party's telephone set.

Considering now the circuitry 37 it will be seen that there is provided a current dividing network comprising resistors 42, 43 and 44 with a ring conductor 46 connected to the junction of resistors 42 and 43 and a tip conductor 47 connected to the junction of resistors 43 and 44. There may be provided a thermistor 48 connected across the circuit between resistors 42 and 44 to allow temperature derating while minimizing the trade-off in current limiting necessary at normal temperatures.

There is provided a diode such as, for example, a Zener diode 49 connected across the tip and ring lead 46 and 47 after the above-noted current divider and thermistor. This diode is oriented to pass current from the tip lead to the ring lead as illustrated in FIG. 3. A light emitting diode or LED 51 is connected across the Zener diode 49 to conduct in the opposite direction from same and a resistor 52 is connected in the ring lead between the Zener diode and LED. By this orientation of Zener diode 49, the back voltage which may be applied across LED 51 is held to a low value when the diode 49 is conducting, and maintains a predetermined voltage across the diode 51 when diode 51 is reverse biased by the polarity of the central office battery.

As a further portion of the circuitry hereof there is provided a photo-responsive transistor 53 disposed in close proximity to the light emitting diode 51 so that photons emitted from the diode when current passes therethrough apply a gating signal to the transistor to cause same to conduct. Although a photo-responsive transistor is shown in this embodiment, it should be understood that other photo-responsive devices could also be employed. The collector of the transistor is connected to a positive power supply terminal 54. The emitter of transistor 53 is coupled as, for example, through a resistor 56 to the base of an output transistor 57. The output transistor 57 has the emitter thereof grounded and the collector directly connected to an output terminal 58 and coupled through a resistor 59 to a further positive power supply terminal 61.

Considering now operation of the present invention as illustrated in FIG. 3 of the drawings, there will be seen that with the tip and ring terminals 31 and 32 connected through the circuitry 33 to opposite ends of the transformer 34 and the receiver on-hook, the tip conductor or line 47 is maintained at a relatively positive potential with respect to the ring line 46. This then causes a current to flow through the Zener diode 49. This condition, of course, occurs only after seizure of the circuit from the originating end so as to connect the tip terminal 31 to the transformer 34. At such time as the terminating station answers the call, i.e., lifting the receiver to place same in an off-hook condition, a reversal of battery potential at the tip and ring occurs. This then causes the tip lead 47 to become more negative than the ring lead 46 and in this condition current flow is blocked by the Zener diode so that current then flows through the light emitting diode 51. Photons emitted by the LED 51 trigger the phototransistor 53 so that current flows therethrough and into the base of transistor 57 so as to turn on this transistor and saturate same. Saturation of transistor 57 lowers the voltage at the upper terminal 58 that is noted to be connected through the resistor 59 to the positive power supply terminal 61. This resistor 59 is chosen such that the value thereof will produce desired output voltages at the terminal 58 for the two conditions of conduction and nonconduction of transistor 57.

The output terminal 58 is preferably connected to logic circuitry and the output signals at terminal 58 are thus adjusted to comprise logic 1 and logic 0 signals. In the condition of normal battery at tip and ring the voltage at terminal 58 may, for example, be 2.4 volts with a positive 5 volts applied to the power supply terminal 61. Saturation of the output transistor 57 may reduce this output terminal voltage to 0.2 volts. These voltages then represent logic 1 and logic 0 signals.

It is to be particularly noted that the circuit of FIG. 3 provides not only for detecting battery reversal but also provides complete isolation between tip and ring leads and the output terminal of the circuit. Additionally the circuit is advantageous in interfacing the telephone circuitry to logic circuitry, such as transistor-transistor logic normally termed TTL logic.

With regard to the various advantages of the present invention, it is noted that this invention does provide a savings in size, weight, power dissipation and immunity to shock and vibration. Additionally this circuit does not require adjustment and, furthermore, provides an increase in speed of operation of about 3 orders of magnitude over prior art circuits. Prior art difficulties with electromechanical relays are entirely obviated herein and prior art difficulties with electronic signaling circuits are overcome by the complete isolation afforded by the present invention. In this latter respect it is noted that any voltage or current surges in the telephone lines can at most damage only the light emitting diode 51. Complete protection for common equipment is attained and, furthermore, it is not possible for noise from the signaling to be coupled back to voice paths. Advantageous interfacing with logic circuitry is also attained herein.

What is claimed is:

1. Apparatus connected to the tip and ring leads of a telephone circuit at a terminating station for detecting the polarity of the local central office battery applied to the telephone circuit leads and for producing a first ouput when the battery polarity is in a first state, and a second output when the battery polarity is in the other state which comprises:

a first diode connected between tip and ring conductors of the telephone circuit;

a light-emitting diode connected in parallel opposition across said first diode; and a photo-responsive device disposed in close proximity to said light-emitting diode and connected across a first power supply for switching between conducting and nonconducting states in response to current flow through said light-emitting diode.

2. The circuit of claim 1 further defined by an output transistor, a resistor connecting the collector and emitter terminals of said output transistor across a second power supply, means coupling the base of said output transistor to said photo-responsive device for switching said output transistor between cut-off and saturation, and an output terminal connected to said second power supply through said resistor.

3. The circuit of claim 2 wherein said resistor has a value in relation to the voltage of said second power supply to produce logic signals at said output terminal.

4. The circuit of claim 2 further defined by said photo-responsive device comprising a phototransistor having the collector thereof directly connected to said first power supply and the emitter resistively coupled to the base of said ouput transistor.

* * * * *

UNITED STATES PATENT OFFICE
CERTIFICATE OF CORRECTION

Patent No. 3,783,198 Dated January 1, 1974

Inventor(s) Francis O. Couch

It is certified that error appears in the above-identified patent and that said Letters Patent are hereby corrected as shown below:

In the References Cited [56] add -- 3,462,606 8/1969 Case 250/214R --.
In the Abstract [57] delete "with logic circuits" and add therefor -- from voice circuits --.
Column 4, line 5, after "shown).", delete "Thus, normal battery polarity is applied to the"; same column, line 6, delete "terminating station."; same column, line 10, after "terminal" change "I" to -- T --; same column, line 22, delete all after the numeral "34"; also, same column, delete lines 23 through 28 in their entirety.

Signed and sealed this 17th day of September 1974.

(SEAL)
Attest:

McCOY M. GIBSON JR.
Attesting Officer

C. MARSHALL DANN
Commissioner of Patents